US009954733B2

(12) United States Patent
Jones et al.

(10) Patent No.: US 9,954,733 B2
(45) Date of Patent: Apr. 24, 2018

(54) SYSTEMS AND METHODS FOR VIRTUALIZING A PROGRAMMABLE LOGIC CONTROLLER

(71) Applicant: Siemens Aktiengesellschaft, München (DE)

(72) Inventors: John David Jones, Johnson City, TN (US); Kellie Culp, Jonesborough, TN (US); Christopher Edward Noe, Johnson City, TN (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 169 days.

(21) Appl. No.: 14/912,735

(22) PCT Filed: Sep. 3, 2013

(86) PCT No.: PCT/US2013/057792
§ 371 (c)(1),
(2) Date: Feb. 18, 2016

(87) PCT Pub. No.: WO2015/034458
PCT Pub. Date: Mar. 12, 2015

(65) Prior Publication Data
US 2016/0197778 A1 Jul. 7, 2016

(51) Int. Cl.
*G06F 15/177* (2006.01)
*H04L 12/24* (2006.01)
(Continued)

(52) U.S. Cl.
CPC ........ *H04L 41/0806* (2013.01); *G05B 19/056* (2013.01); *G06F 17/30864* (2013.01)

(58) Field of Classification Search
CPC ........... H04L 41/0806; G06F 17/30864; G05B 19/056
See application file for complete search history.

(56) References Cited

U.S. PATENT DOCUMENTS

| 7,007,158 B1 * | 2/2006 | Mahmoud ........... H04L 67/1097 713/1 |
| 2008/0208362 A1 * | 8/2008 | Grgic .................... G06F 9/5077 700/2 |
| 2012/0278058 A1 | 11/2012 | Lee |

FOREIGN PATENT DOCUMENTS

| CN | 1804744 A | 7/2006 |
| CN | 202331148 U | 7/2012 |

(Continued)

OTHER PUBLICATIONS

PCT International Search Report dated Jun. 11, 2014 corresponding to PCT International Application No. PCT/US2013/057792 filed Sep. 3, 2013 (11 pages).

*Primary Examiner* — John B Walsh (57) ABSTRACT

In some embodiments, a method (200) is provided for creating a virtual programmable logic controller (PLC) based on a physical PLC. The method (200) includes (1) connecting to the physical PLC over a network (201); (2) obtaining configuration data from the physical PLC over the network (202); (3) if an expansion module is coupled to the physical PLC, obtaining configuration data for the expansion module over the network (204); (4) storing configuration data for the physical PLC in a configuration medium (206); and (5) if configuration data for the expansion module is obtained, storing configuration data for the expansion module in the configuration medium (206). Numerous other embodiments are provided.

17 Claims, 3 Drawing Sheets

(51) Int. Cl.
    *G05B 19/05*     (2006.01)
    *G06F 17/30*     (2006.01)

(56)     References Cited

FOREIGN PATENT DOCUMENTS

| | | |
|---|---|---|
| CN | 102799510 A | 11/2012 |
| EP | 1865394 A1 | 12/2007 |
| EP | 2544057 A1 | 1/2013 |
| GB | 2422234 A | 7/2006 |

* cited by examiner

SYSTEMS AND METHODS FOR VIRTUALIZING A PROGRAMMABLE LOGIC CONTROLLER

CROSS REFERENCE TO RELATED APPLICATIONS

This Application is the U.S. National Stage of International Application No. PCT/US2013/057792 filed 3 Sep. 2013 and claims benefit thereof, the entire content of which is hereby incorporated herein by reference.

FIELD

The present application relates to process control systems, and more specifically to systems and methods for virtualizing a programmable logic controller (PLC).

BACKGROUND

PLCs are commonly used for process control and automation applications. A virtual PLC is a functional, software representation of a physical PLC that may be used for testing and diagnostic purposes. To be an effective tool, a virtual PLC should produce the same results as the physical PLC it represents when exposed to the same conditions.

Configuration of a virtual PLC and its virtual input/output (I/O) can be time consuming, error prone and programming intensive. As such, a need exists for improved systems and methods for virtualizing a PLC.

SUMMARY

In some embodiments, a method is provided for creating a virtual programmable logic controller (PLC) based on a physical PLC. The method includes (1) connecting to the physical PLC over a network; (2) obtaining configuration data from the physical PLC over the network; (3) if an expansion module is coupled to the physical PLC, obtaining configuration data for the expansion module over the network; (4) storing configuration data for the physical PLC in a configuration medium; and (5) if configuration data for the expansion module is obtained, storing configuration data for the expansion module in the configuration medium.

In some embodiments, a non-transitory computer-readable storage medium with an executable program stored thereon is provided. The program instructs a processor to (1) connect to a physical PLC over a network; (2) obtain configuration data from the physical PLC over the network; (3) if an expansion module is coupled to the physical PLC, obtain configuration data for the expansion module over the network; (4) store configuration data for the physical PLC in a configuration medium; and (5) if configuration data for the expansion module is obtained, store configuration data for the expansion module in the configuration medium.

In some embodiments, a system is provided for creating a virtual PLC based on a physical PLC. The system includes (1) a physical PLC coupled to a communications network; and (2) a computer system coupled to the communications network and configured to (a) connect to the physical PLC over the communications network; (b) obtain configuration data from the physical PLC over the communications network; (c) if an expansion module is coupled to the physical PLC, obtain configuration data for the expansion module over the communications network; (d) store configuration data for the physical PLC in a configuration medium; and (e) if configuration data for the expansion module is obtained, store configuration data for the expansion module in the configuration medium.

Numerous other aspects are provided. Other features and aspects of the present invention will become more fully apparent from the following detailed description, the appended claims and the accompanying drawings.

DETAILED DESCRIPTION

Figure 1:
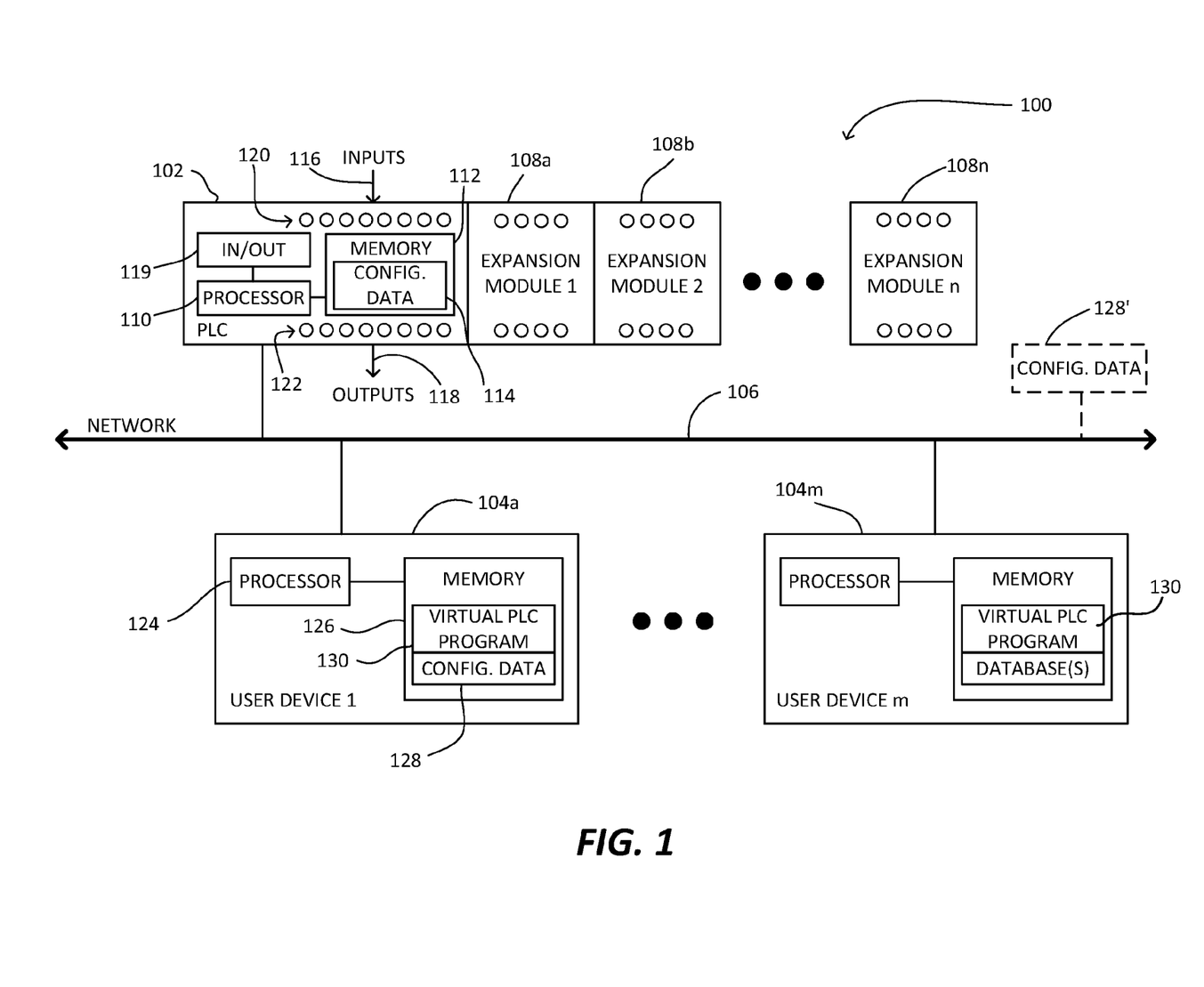
FIG. 1 is a schematic diagram of an example system for creating a virtual PLC based on a physical PLC in accordance with embodiments provided herein.

FIG. 1 is a schematic diagram of an example system 100 for creating a virtual PLC based on a physical PLC in accordance with embodiments provided herein. With reference to FIG. 1, the system 100 includes a physical PLC 102 in communication with at least one user device 104a over a communications network 106. One or more additional user devices, represented generally by user device 104m, may be in communication with the user device 104a and/or the physical PLC 102.

The physical PLC 102 may be any suitable PLC, such as a SIMATIC controller available from Siemens Aktiengesellschaft, Munich, Germany (e.g., the S7 or similar series) or another commercially available PLC. The physical PLC 102 may include one or more expansion modules 108a-n which provide inputs and/or outputs for factory or other automation applications (e.g., 24 vDC, 120 vAC, 240 vAC, other voltages types and/or ranges, relay outputs, current inputs or outputs, etc.). Example expansion modules include analog signal modules, digital signal modules, relay modules, communications modules (e.g., that provide serial communications, parallel communications, USB connection(s), Ethernet ports, or the like), etc. Commercially available expansion modules include the signal modules available from Siemens Aktiengesellschaft, Munich, Germany, or the like. Any other suitable PLC and/or expansion module may be employed. In some embodiments, no expansion modules may be employed by the physical PLC 102.

The physical PLC 102 includes a processor 110, such as a microprocessor, central processing unit (CPU), microcontroller or the like, coupled to a memory 112. Example memories include random access memory (RAM), dynamic RAM, flash memory, solid state memory, a hard disk drive, remote or cloud-based memory, or the like. As described further below, in some embodiments, the memory 112 stores configuration data 114 for the physical PLC 102 and/or external modules coupled to the physical PLC 102. For example, configuration data 114 may be stored in one or more memory locations and/or databases.

The processor 110 may execute computer program code, stored within memory 112 or another memory location, that controls operation and/or communication services of the physical PLC 102 and/or expansion modules 108a-n.

The physical PLC 102 may include a plurality of inputs 116 and/or outputs 118 (interfaced by I/O interface 119, for example). Example inputs 116 may be analog inputs, digital inputs, integrated inputs, voltage inputs, current inputs, etc.

Example outputs 118 may be analog outputs, digital outputs, integrated outputs, voltage outputs, current outputs, scaled outputs, etc. Other numbers, types, etc., of inputs and/or outputs may be employed. In some embodiments, input indicators 120, such as light emitting diodes, may indicate the status of inputs 116 while output indicators 122 may indicate the status of outputs 118. In some embodiments, the physical PLC 102 may not include inputs and/or outputs, with expansion modules 108*a-n* providing inputs and/or outputs for the physical PLC 102.

User device 104*a* (and/or user device 104*m*) may be a desktop computer, laptop computer, server, tablet computer, smartphone, etc. As shown in FIG. 1, the user device 104*a* may include a processor 124, such as a microprocessor, central processing unit (CPU), microcontroller or the like, coupled to a memory 126. Example memories include RAM, dynamic RAM, flash memory, solid state memory, a hard disk drive, remote or cloud-based memory, or the like. As described further below, in some embodiments, the memory 126 may serve as a storage medium that stores configuration data 128 obtained from the physical PLC 102. In other embodiments, such configuration data 128 may be stored remote from the user device 104*a*, such as in a remote storage device, a remote server, etc., shown in phantom in FIG. 1 as reference numeral 128'. Example configuration data may include information relating to physical characteristics of the physical PLC 102, other configuration data for the physical PLC 102, configuration data for inputs and/or outputs of the physical PLC 102, identification of expansion modules coupled to the physical PLC 102, configuration data for expansion modules coupled to the physical PLC 102, and/or the like. Configuration data 128 may be stored in one or more memory locations and/or databases.

The memory 126 also may include a virtual PLC program 130 that creates and/or executes a virtual PLC based on configuration data obtained from the physical PLC 102 (as described below). The processor 124 may execute computer program code, stored within memory 126 or another memory location, that controls operation and/or communication services of the user device 104*a*. Other systems, methods, computer program products and data structures also may be provided. Each computer program product described herein may be carried by a non-transitory medium readable by a computer (e.g., a floppy disc, a compact disc, a DVD, a hard drive, a random access memory, etc.).

Communications network 106 may include any suitable communications network such as a wired, wireless, optical, wide area, local area, or other network.

In operation, PLC 102 may be employed to control operation of factory automation or other processes. Processor 124 of user device 104*a*, or another user device, may execute virtual PLC program 130 to obtain configuration data from PLC 102 and/or expansion modules 108*a-n* over communications network 106, and/or to create a virtual PLC as described below with reference to FIGS. 2 and 3.

Figure 2:
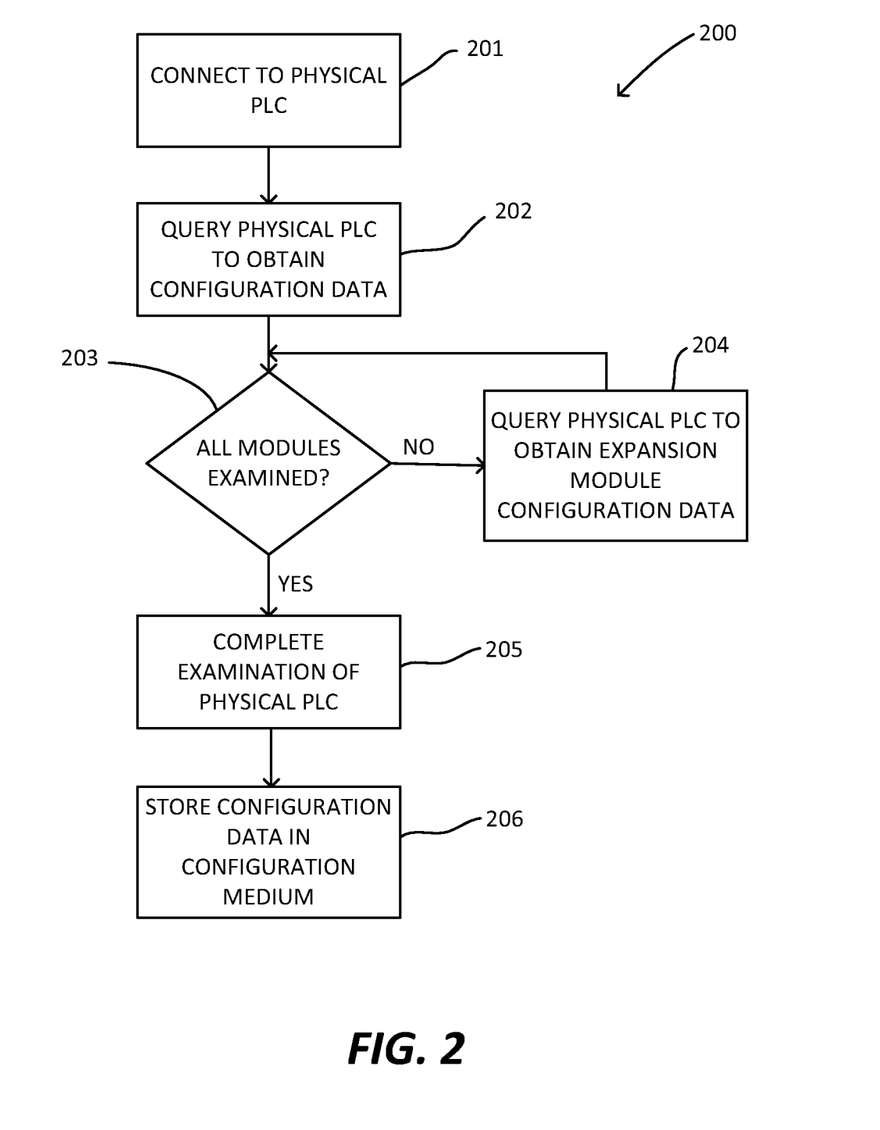
FIG. 2 is a flowchart of a method of obtaining configuration data from a physical PLC in accordance with embodiments provided herein.

FIG. 2 is a flowchart of a method 200 of obtaining configuration data from a physical PLC in accordance with embodiments provided herein. With reference to FIG. 2, in Block 201, user device 104*a* connects with physical PLC 102 over communications network 106. For example, processor 124 may connect to an internet protocol (IP) address or other address associated with the physical PLC 102. Example computer program code and/or command structure for Block 201 is provided below. Other types of computer program code and/or command structures may be employed.

```
//*********************************************************
// * Establish connection to the physical PLC
//
//*********************************************************
OpenNetworkConnection(PLC1);
EstablishLogicalSession(PLC1);
```

In Block 202, the user device 104*a* queries physical PLC 102 for configuration data. For example, the user device 104*a* may issue a request to the physical PLC 102 for configuration information regarding the physical PLC 102 and/or any expansion modules coupled to the physical PLC 102. In some embodiments, the request may be a parse identification record information instruction or similar command issued across the network 106 to the physical PLC 102. The request may be for configuration data 114 stored in memory 112 of physical PLC 102, for example. In some embodiments, configuration data may include information about the processor 110, the memory 112, I/O interface 119 and/or expansion modules 108*a-n* such as device type, hardware revision, firmware number, number of I/O ports, type of I/O ports, mapping of I/O ports (e.g., so a program may access the I/O ports), configuration of ports (e.g., a discrete output point, an analog input, an analog input that accepts voltages in a pre-defined range, etc.), tuning of I/O ports, capabilities of the physical PLC 102 and/or expansion modules, and/or the like. Other types of configuration data may include physical characteristics of the physical PLC 102, other configuration data for inputs and/or outputs of the physical PLC, identification of number and/or types expansion modules coupled to the physical PLC 102. In some embodiments, such configuration data may be stored in the user device 104*a* (as configuration data 128), and/or in another storage location as configuration data 128', for example.

Example computer program code and/or command structure for Block 202 is provided below. Other types of computer program code and/or command structures may be employed.

```
//
//*********************************************************
// * Process PLC
//
//*********************************************************
// *** Query Physical PLC to obtain identification data
PlcRecord = New(PlcRecord);
PlcRecord = ReadFromPLC("PLC Identification Record");
// *** Parse identification record information and save in
local Plc Record Structure
PlcConfigStruct = New(PlcConfigStruct);
PlcConfigStruct.Append( Parse(PlcRecord, Name) );
PlcConfigStruct.Append( Parse(PlcRecord, DeviceType) );
PlcConfigStruct.Append( Parse(PlcRecord, HardwareRevision)
);
PlcConfigStruct.Append( Parse(PlcRecord, FirmwareRevision)
);
PlcConfigStruct.Append( Parse(PlcRecord, SerialNumber) );
PlcConfigStruct.Append( Parse(PlcRecord,
NumberDiscreteInputs) );
PlcConfigStruct.Append( Parse(PlcRecord,
NumberDiscreteOutputs) );
PlcConfigStruct.Append( Parse(PlcRecord,
NumberAnalogInputs) );
 . .
 . . // Many more parameters... .
 . .
PlcConfigStruct.Append( Parse(PlcRecord,
NumberAnalogOutputs) );
// *** Query Physical PLC to obtain I/O configuration
```

-continued

```
record
PlcIoConfigRecord = New(PlcIoConfigRecord);
PlcIoConfigRecord = ReadFromPLC("PLC I/O Configuration
Record");
// *** Parse PLC I/O configuration record information and
save in local Plc I/O
// *** Record Structure
PlcIoConfigStruct = New(PlcIoConfStruct);
PlcIoConfStruct.Append( Parse(PlcIoConfigRecord,
InputCapabilities) );
PlcIoConfStruct.Append( Parse(PlcIoConfigRecord,
InputRanges) );
PlcIoConfStruct.Append( Parse(PlcIoConfigRecord,
InputFiltering) );
PlcIoConfStruct.Append( Parse(PlcIoConfigRecord,
OutputCapabilities) );
PlcIoConfStruct.Append( Parse(PlcIoConfigRecord,
OutputRanges) );
..
. . // Many more parameters... .
..
PlcIoConfStruct.Append( += Parse(PlcIoConfigRecord,
OutputStopBehavior) );
```

In Block 203, an inquiry is made to determine if configuration data has been obtained for all expansion modules coupled to the physical PLC 102. For example, for each expansion module identified in Block 202, the user device 104a may determine whether all relevant configuration data has been communicated to the user device 104a from the physical PLC 102 (e.g., device type, hardware revision, firmware number, number of I/O ports, type of I/O ports, mapping of I/O ports, configuration of I/O ports, tuning of I/O ports, etc.).

If in Block 203 it is determined that not all expansion modules have been examined, in Block 204 the user device 104a may query the physical PLC 102 and/or any expansion module to obtain additional expansion module configuration data. For example, the physical PLC 102 may be queried for information about a specific expansion module. Blocks 203 and 204 may be repeated until all relevant configuration data has been obtained for each expansion module 108a-n.

Example computer program code and/or command structure for Blocks 203 and 204 is provided below. Other types of computer program code and/or command structures may be employed.

```
//
//*************************************************************'
// * Process Expansion I/O modules
//
//*************************************************************'
// *** Determine how many modules are present
Int NumModules = ReadFromPlc("Number of modules present");
// *** Process the modules one at a time
For (N=1 to NumModules)
    // *** Query Physical PLC to obtain a Module
    Identification record for module
    // *** number 'N'
    ModuleRecord = New(ModuleRecord)
    ModuleRecord = ReadFromPLC("Module(N) Identification
    Record");
    // *** Parse module identification record information
    and save in local
    // *** module record structure
    ModuleConfigStruct(N) = New(ModuleConfigStruct(N));
    ModuleConfigStruct(N) .Append( Parse(ModuleRecord,
    Name) );
    ModuleConfigStruct(N) .Append( Parse(ModuleRecord,
    Type) );
    ModuleConfigStruct(N) .Append( Parse(ModuleRecord,
    HardwareRevision) );
    ModuleConfigStruct(N) .Append( Parse(ModuleRecord,
    FirmwareRevision) );
    ModuleConfigStruct(N) .Append( Parse(ModuleRecord,
    SerialNumber) );
    ModuleConfigStruct(N) .Append( Parse(ModuleRecord,
    NumberDiscreteInputs) );
    ModuleConfigStruct(N) .Append( Parse(ModuleRecord,
    NumberDiscreteOutputs) );
    ModuleConfigStruct(N) .Append( Parse(ModuleRecord,
    NumberAnalogInputs);
    ..
    . . // Many more parameters... .
    ..
    ModuleConfigStruct(N) .Append( Parse(ModuleRecord,
    NumberAnalogOutputs) );
    // *** Query Physical PLC to obtain a Module I/O
    configuration record for
    // *** module number 'N'
    New(ModuleIoRecord)
    ModuleIoRecord = ReadFromPLC("Module(N) I/O Record");
    // *** Parse module I/O record information and save in
    local module record structure
    New(ModuleIoStruct(N) );
    ModuleIoStruct(N) .Append( Parse(ModuleIoRecord,
    InputCapabilities) );
    ModuleIoStruct(N) .Append( Parse(ModuleIoRecord,
    InputRanges) );
    ModuleIoStruct(N) .Append( Parse(ModuleIoRecord,
    InputFiltering);
    ModuleIoStruct(N) .Append( Parse(ModuleIoRecord,
    OutputCapabilities);
    ModuleIoStruct(N) .Append( Parse(ModuleIoRecord,
    OutputRanges);
    ..
    . . // Many more parameters... .
    ..
    ModuleIoStruct(N) .Append( += Parse(ModuleIoRecord,
    OutputStopCapabilities);
Next
```

If in Block 203 it is determined that all expansion modules have been examined, method 200 proceeds to Block 205.

In Block 205 the examination of the physical PLC 102 and any expansion modules 108a-n is completed. For example, the communication channel between the physical PLC 102 and user device 104a may be terminated.

In Block 206 any remaining configuration data for the physical PLC 102 and/or expansion modules is stored in a "configuration medium" such as memory 126 of user device 104a or another user device, in local or remote storage, in one or more databases, and/or in any other location. In some embodiments, configuration data is stored in an extensible markup language (XML) file (e.g., a file that includes XML formatted data and/or commands). Any other data format and/or file type may be employed. The configuration data may be accessible to any number of user devices.

Example computer program code and/or command structure for Block 205 and 206 is provided below. Other types of computer program code and/or command structures may be employed.

```
//
//*************************************************************'
// * Create output media (XML file)
//
//*************************************************************'
MediumFile = New("MediumFile.xml");
MediumFile.Create( );
// *** Add PLC information
MediumFile.Append( ConvertToXml(PlcConfigStruct) );
MediumFile.Append( ConvertToXml(PlcIoConfStruct) );
// *** Add information for all expansion modules
```

```
For (N=1 to NumModules)
   MediumFile.Append(
   ConvertToXml(ModuleConfigStruct(N)) );
   MediumFile.Append( ConvertToXml(ModuleIoStruct(N))
   );
Next
MediumFile.Finalize( );
MediumFile.Close( );
//
//*******************************************************'
// * Finish
//
//*******************************************************'
CloseNetworkConnection(PLC1);
```

Method 200 may be implemented as one or more computer program products executable on one or more computer systems, such as user device 104a, other user devices, remote computer systems or the like. Each computer program product described herein may be carried by and/or on a non-transitory and/or tangible medium readable by a computer (e.g., a floppy disc, a compact disc, a DVD, a hard drive, a random access memory, etc.). Steps of method 200 may be performed in other orders, and/or at least a portion of some steps may be performed at the same time.

Once configuration data has been obtained for the physical PLC 102 and/or expansion modules coupled to the physical PLC 102 using method 200 of FIG. 2, a virtual PLC may be created based on the configuration data. For example, a commercially available PLC simulator, such as the SIMATIC S7-PLCSIM available from Siemens Aktiengesellschaft, Munich, Germany, or another suitable PLC simulator, may be employed to create a virtual PLC instance that is populated by configuration data obtained by method 200 of FIG. 2.

Figure 3:
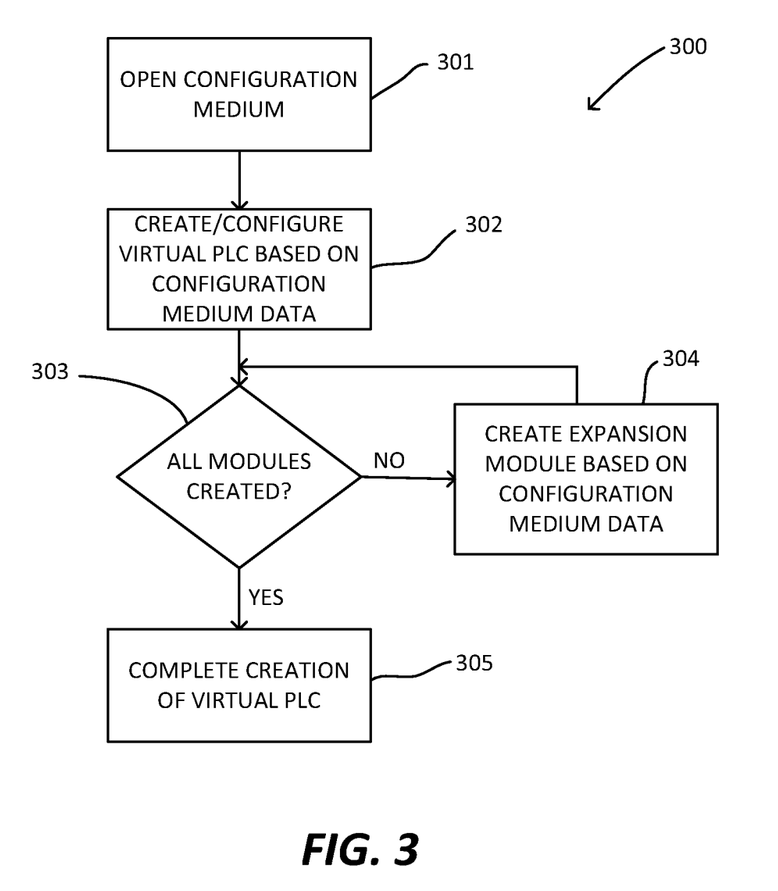
FIG. 3 is a flowchart of a method of creating a virtual PLC in accordance with embodiments provided herein.

FIG. 3 is a flowchart of a method 300 of creating a virtual PLC in accordance with embodiments provided herein. With reference to FIG. 3, in Block 301, a user device such as user device 104a, which may be executing a PLC simulator program, connects with the configuration medium which contains configuration data for the physical PLC 102 and/or expansion modules 108a-n. As stated, configuration information for the physical PLC 102 and expansion modules 108a-n may be stored within the memory 126 of user device 104a, within another user device, within a remote or other storage device, etc. In some embodiments, configuration data for the physical PLC 102 and/or expansion modules 108a-n may be stored in an XML-based data file, although other data formats and/or file types may be used.

Example computer program code and/or command structure for Block 301 is provided below. Other types of computer program code and/or command structures may be employed.

```
//
//*******************************************************'
// * Start Simulation
// *
// * It is assumed here that a PLC simulator has been
// * started by a computer system external to the physical
// * PLC and has created a PLC instance to which we
// * can establish a connection to this virtual PLC data.
// *
//
//*******************************************************'
//
//*******************************************************'
// * Establish connection to the virtual PLC and
// * open the input medium
//
//*******************************************************'
// *** Establish virtual connection
OpenVirtualNetworkConnection(PLC1);
EstablishLogicalSession(PLC1);
// *** Open input medium
MediumFile = Open("MediumFile.xml");
```

Based on the data stored within the configuration file, in Block 302, a virtual PLC is created (e.g., a virtual PLC instance is created using a PLC simulator and is populated with data obtained in accordance with embodiments provided herein to create the virtual PLC). For example, an "instance" of a virtual PLC may be formed on the user device 104a, or another user device, that simulates operation of the physical PLC 102. Virtual expansion modules may be created to simulate operation of any expansion modules coupled to physical PLC 102.

Example computer program code and/or command structure for Block 302 is provided below. Other types of computer program code and/or command structures may be employed.

```
//
//*******************************************************'
// * Process PLC
//
//*******************************************************'
// *** Create a PLC object
PlcObject = New(PlcObject);
// *** Read the configuration data from the medium and add
it to the PLC
New PlcConfigRecord = MediumFile.Read("PlcConfigRecord");
PlcObject.WriteConfigRecord( EncodeRecord(PlcConfigRecord)
);
// *** Read the I/O configuration data from the medium and
add it to the PLC
New PlcIoConfigRecord =
MediumFile.Read("PlcIoConfigRecord");
PlcObject.WriteIoConfigRecord(
EncodeRecord(PlcIoConfigRecord) );
```

In Block 303, an inquiry is made to determine if all virtual expansion modules have been created. For example, for each expansion module identified in Block 202 of method 200, the user device 104a may create a virtual expansion module to simulate operation of the physical expansion module.

If in Block 303 it is determined that not all virtual expansion modules have been created, in Block 304 the user device 104a may obtain additional information from the stored configuration data and employ the information to create virtual expansion modules. Blocks 303 and 304 may be repeated until all relevant virtual expansion modules have been created.

Example computer program code and/or command structure for Block 303 and/or 304 is provided below. Other types of computer program code and/or command structures may be employed.

```
//
//*******************************************************'
// * Process Expansion Modules
//
//*******************************************************'
Int NumModules = MediumFile.Read("Number of Modules");
For (N=1 to NumModules)
```

-continued

```
// *** Create an Expansion Module object
ModuleObject(N) = New(ModuleObject);
// *** Read the configuration data from the medium and
add it to the module
New ModConfigRecord = MediumFile.Read("Module(N)
ConfigRecord");
ModuleObject(N).WriteConfigRecord(
    EncodeRecord(ModConfigRecord) );
// *** Read the I/O configuration data from the medium
and add it to the module
New ModIoConfigRecord = MediumFile.Read("Module(N)
IoConfigRecord");
ModuleObject(N).WriteIoConfigRecord(
    EncodeRecord(ModIoConfigRecord) );
Next
//
//*************************************************************
// * Transfer personality to PLC and its expansion modules
//
//*************************************************************
TransferObject(PlcObject);
For (N = 1 to NumberModules)
    TransferObject(ModuleObject(N));
Next
//
//*************************************************************
// * Finish
//
//*************************************************************
```

If in Block 303 it is determined that all expansion modules have been examined, method 300 proceeds to Block 305. In Block 305, creation of the virtual PLC and any virtual expansion modules is completed. The virtual PLC may then be employed to simulate operation of the physical PLC 102.

Example computer program code and/or command structure for Block 305 is provided below. Other types of computer program code and/or command structures may be employed.

MediumFile.Close( );
DisconnectFromVirtualPlc( );

Method 300 may be implemented as one or more computer program products executable on one or more computer systems, such as user device 104a, other user devices, remote computer systems or the like. Each computer program product described herein may be carried by and/or on a non-transitory and/or tangible medium readable by a computer (e.g., a floppy disc, a compact disc, a DVD, a hard drive, a random access memory, etc.). Steps of method 300 may be performed in other orders, and/or at least a portion of some steps may be performed at the same time.

Accordingly, while the present invention has been disclosed in connection with the example embodiments thereof, it should be understood that other embodiments may fall within the spirit and scope of the invention, as defined by the following claims.

The invention claimed is:

1. A method of creating a virtual programmable logic controller (PLC) based on a physical PLC comprising:
   connecting to the physical PLC over a network;
   obtaining configuration data from the physical PLC over the network;
   if an expansion module is coupled to the physical PLC, obtaining configuration data for the expansion module over the network;
   storing configuration data for the physical PLC in a configuration medium; and
   if configuration data for the expansion module is obtained, storing configuration data for the expansion module in the configuration medium,
   wherein obtaining configuration data from the physical PLC includes querying the physical PLC to obtain physical characteristics of the physical PLC, configuration data for inputs and outputs of the physical PLC, and identification of expansion modules coupled to the physical PLC.

2. The method of claim 1, further comprising creating the virtual PLC based on the stored configuration data.

3. The method of claim 2, wherein creating the virtual PLC based on the stored configuration data includes:
   accessing the stored configuration data for the physical PLC;
   creating the virtual PLC based on the stored configuration data; and
   creating a virtual expansion module based on expansion module configuration data stored in the configuration medium.

4. The method of claim 1, wherein connecting to the physical PLC includes connecting to the physical PLC over an Ethernet connection.

5. The method of claim 1, wherein storing configuration data for the physical PLC includes storing a representation of the configuration data for the physical PLC in an XML-based file.

6. The method of claim 1, wherein the configuration medium is an XML-based file stored in a memory of a computer system.

7. A non-transitory computer-readable storage medium with an executable program stored thereon, wherein the program instructs a processor to:
   connect to a physical PLC over a network;
   obtain configuration data from the physical PLC over the network;
   if an expansion module is coupled to the physical PLC, obtain configuration data for the expansion module over the network;
   store configuration data for the physical PLC in a configuration medium; and
   if configuration data for the expansion module is obtained, store configuration data for the expansion module in the configuration medium,
   further comprising computer program code configured to query the physical PLC to obtain physical characteristics of the physical PLC, configuration data for inputs and outputs of the physical PLC, and identification of expansion modules coupled to the physical PLC.

8. The computer-readable storage medium of claim 7, further comprising computer program code configured to create a virtual PLC based on the stored configuration data.

9. The computer-readable storage medium of claim 8, further comprising computer program code configured to:
   access the stored configuration data for the physical PLC;
   create the virtual PLC based on the stored configuration data; and
   create a virtual expansion module based on expansion module configuration data stored in the configuration medium.

10. The computer-readable storage medium of claim 7, further comprising computer program code configured to connect to the physical PLC over an Ethernet connection.

11. The computer-readable storage medium of claim 7, further comprising computer program code configured to store a representation of the configuration data for the physical PLC in an XML-based file.

12. A system for creating a virtual programmable logic controller (PLC) based on a physical PLC comprising:

a physical PLC coupled to a communications network; and
a computer system coupled to the communications network and configured to:
  connect to the physical PLC over the communications network;
  obtain configuration data from the physical PLC over the communications network;
  if an expansion module is coupled to the physical PLC, obtain configuration data for the expansion module over the communications network;
  store configuration data for the physical PLC in a configuration medium; and
  if configuration data for the expansion module is obtained, store configuration data for the expansion module in the configuration medium,
wherein the computer system is configured to query the physical PLC to obtain physical characteristics of the physical PLC, configuration data for inputs and outputs of the physical PLC.

13. The system of claim 12, wherein the computer system is further configured to create the virtual PLC based on the stored configuration data.

14. The system of claim 13, wherein the computer system is configured to:
  access the stored configuration data for the physical PLC;
  create the virtual PLC based on the stored configuration data; and
  create a virtual expansion module based on expansion module configuration data stored in the configuration medium.

15. The system of claim 12, wherein the computer system is configured to connect to the physical PLC over an Ethernet connection.

16. The system of claim 12, wherein the computer system is configured to query the physical PLC to obtain identification of expansion modules coupled to the physical PLC.

17. The system of claim 12, wherein the computer system is configured to store a representation of the configuration data for the physical PLC in an XML-based file.

\* \* \* \* \*